United States Patent
Qiu et al.

(10) Patent No.: US 10,948,096 B2
(45) Date of Patent: Mar. 16, 2021

(54) TEMPERATURE REGULATING VALVE

(71) Applicant: Zhejiang Sanhua Automotive Components Co., Ltd., Zhejiang (CN)

(72) Inventors: Haoming Qiu, Zhejiang (CN); Zhiyong Liao, Zhejiang (CN); Bin Yin, Zhejiang (CN); Yang Lv, Zhejiang (CN); Yongjin Luo, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 117 days.

(21) Appl. No.: 16/087,858

(22) PCT Filed: May 22, 2017

(86) PCT No.: PCT/CN2017/085288
§ 371 (c)(1),
(2) Date: Sep. 24, 2018

(87) PCT Pub. No.: WO2017/206750
PCT Pub. Date: Dec. 7, 2017

(65) Prior Publication Data
US 2020/0141510 A1    May 7, 2020

(30) Foreign Application Priority Data

May 31, 2016 (CN) .......................... 201610377278.X
May 31, 2016 (CN) .......................... 201610377298.7
May 31, 2016 (CN) .......................... 201610377683.1

(51) Int. Cl.
F16K 31/00    (2006.01)
F16K 11/044   (2006.01)
F01P 7/16     (2006.01)

(52) U.S. Cl.
CPC .......... *F16K 31/002* (2013.01); *F16K 11/044* (2013.01); *F01P 7/16* (2013.01)

(58) Field of Classification Search
CPC ........ F16K 11/044; F16K 31/002; F01P 7/16; G05D 23/02; G05D 23/021; G05D 23/022;
(Continued)

(56) References Cited

U.S. PATENT DOCUMENTS 6,253,837 B1    7/2001  Seiler et al.
6,935,569 B2    8/2005  Brown et al.
(Continued)

FOREIGN PATENT DOCUMENTS

CN    101535914 A    9/2009
CN    102224367 A    10/2011
(Continued)

OTHER PUBLICATIONS

International Search Report dated Aug. 23, 2017 in connection with International Application No. PCT /CN2017 /085288.
(Continued)

*Primary Examiner* — Marc E Norman
(74) *Attorney, Agent, or Firm* — Wolf, Greenfield & Sacks, P.C.

(57) ABSTRACT

A thermostatic valve includes a valve body with a cavity provided therein, an end cover assembly, and a thermal actuator and at least one spring that are mounted in the cavity. The valve body is provided with at least three ports including a first port, a second port and a third port. The thermal actuator includes a valve rod and a main body. The spring includes a first spring. The cavity includes a first cavity and a second cavity, and the second cavity is away from the end cover assembly. The first port is in communication with the first cavity, and the third port is in communication with the second cavity. The first spring is partially or completely located in the second cavity. The thermostatic valve further includes a guide fitting part. The thermostatic
(Continued)

valve has a simple structure, and the operation thereof is more stable and reliable.

13 Claims, 8 Drawing Sheets

(58) Field of Classification Search
CPC ... G05D 23/024; G05D 23/025; G05D 23/132
See application file for complete search history.

(56) References Cited

U.S. PATENT DOCUMENTS

| | | |
|---|---|---|
| 2004/0232249 A1 | 11/2004 | Brown et al. |
| 2009/0272441 A1 | 11/2009 | Sasaki et al. |
| 2010/0126594 A1 | 5/2010 | Sheppard |
| 2010/0175640 A1 | 7/2010 | Sheppard |
| 2011/0005741 A1 | 1/2011 | Sheppard |
| 2012/0055565 A1 | 3/2012 | Kanzaka et al. |
| 2012/0247582 A1 | 10/2012 | Lamb et al. |
| 2019/0107037 A1* | 4/2019 | Qiu .......................... F01P 7/16 |
| 2019/0163212 A1* | 5/2019 | Qiu .................... G05D 23/1333 |

FOREIGN PATENT DOCUMENTS

| | | |
|---|---|---|
| CN | 102312997 A | 1/2012 |
| CN | 103573993 A | 2/2014 |
| CN | 103574264 A | 2/2014 |
| CN | 103574265 A | 2/2014 |
| CN | 103867692 A | 6/2014 |
| CN | 204420293 U | 6/2015 |
| EP | 2 884 134 A1 | 6/2015 |
| JP | 2007-333068 A | 12/2007 |
| JP | 2011-007321 A | 1/2011 |
| WO | WO 2008/028559 A2 | 3/2008 |

OTHER PUBLICATIONS

Office Action for Japanese Application No. 2019-514164, dated Oct. 28, 2019.

Extended European Search Report for European Application No. 17805695.8, dated Apr. 15, 2020.

* cited by examiner

TEMPERATURE REGULATING VALVE

This application is a national stage filing under 35 U.S.C. 371 of International Patent Application Serial No. PCT/CN2017/085288, filed May 22, 2017, which claims priority to the following Chinese applications, the entire contents of these applications are incorporated herein by reference in their entirety:

1) Chinese Patent Application No. 201610377278.X, titled "THERMOSTATIC VALVE", filed on May 31, 2016 with the State Intellectual Property Office of People's Republic of China:

2) Chinese Patent Application No. 201610377683.1, titled "THERMOSTATIC VALVE", filed on May 31, 2016 with the State Intellectual Property Office of People's Republic of China; and 3) Chinese Patent Application No. 201610377298.7, titled "THERMOSTATIC VALVE", filed on May 31, 2016 with the State Intellectual Property Office of People's Republic of China.

FIELD

The present application relates to the field of fluid control, and specifically to a thermostatic valve.

BACKGROUND

During running of a vehicle, its various components need to be lubricated timely by lubricating oil, so as to ensure a normal running of the vehicle. If the lubricating property of the lubricating oil is not good enough, the service life of the vehicle will be adversely affected. In addition, the lubricating property of the lubricating oil is associated with the temperature of the lubricating oil. If the temperature of the lubricating oil is too high or too low, the lubrication performance of the lubricating oil will be affected.

The temperature of the lubricating oil is generally not too high during normal running. In the case that the vehicle is overloaded or is set in a four-wheel drive mode to run in snow or run off-road, the vehicle is running in a state that a hydraulic torque converter slips excessively, which may cause the gearbox oil to have an excessively high temperature, thus degrading the lubricating property.

The temperature of the gearbox oil is mainly adjusted by a temperature-controlled flow path constituted by a thermostatic valve and a heat exchanger for external cooling. When the temperature of the gearbox oil line increases, the heat-sensitive material of a thermal actuator expands due to heat, the passage for the gearbox oil to directly flow back to the gearbox is blocked, or the flow rate of the passage decreases, therefore the high temperature oil enters the heat exchanger for external cooling to be cooled and then flows back to the gearbox. Conversely, when the oil temperature is too low, the heat-sensitive material of the thermal actuator begins to solidify and contract, a valve rod is reset and the passage for the gearbox oil to directly flow back to the gearbox is open. The oil in the gearbox oil line exchanges heat with exothermic gearbox components in the flow process, so that the oil temperature is controlled within an appropriate range.

SUMMARY

The technical solution of the present application is to provide a thermostatic valve having a relatively simple structure and a certain guiding function during operation, so that the thermostatic valve is relatively stable during the operation process and a thermal actuator of the thermostatic valve shakes slightly.

A thermostatic valve includes a valve body with a cavity provided therein, an end cover assembly, and a thermal actuator and at least one spring that are mounted in the cavity. The valve body is provided with at least three ports, which include a first port, a second port, and a third port. The thermal actuator includes a valve rod and a main body. The spring includes a first spring. The cavity includes a first cavity and a second cavity, and the second cavity is away from the end cover assembly relative to the first cavity. The first port is in communication with the first cavity, and the third port is in communication with the second cavity. The first spring is partially or completely located in the second cavity. The thermal actuator is partially or completely located in the first cavity, and the first cavity is larger than the thermal actuator. One end of the thermal actuator directly/indirectly abuts against or is supported on one end of the first spring close to the thermal actuator, and the other end of the thermal actuator is position-limited to the end cover assembly. The thermostatic valve further includes a guide fitting part. The guide fitting part includes at least two protrusions, a recess located between adjacent protrusions and an annular part with a substantially annular structure. The guide fitting part is in sliding fit with an inner wall part of the first cavity, and/or the guide fitting part is in sliding fit with the thermal actuator. In an axial direction of the thermal actuator, the guide fitting part is located between an intersection of the first port and the first cavity and an intersection of the second cavity and the first cavity.

In the thermostatic valve, a guide fitting part is provided between a relatively fixed part of the thermostatic valve and a part of the thermal actuator requiring movement, and the guide fitting part is arranged between the first port and the second cavity, so that the thermal actuator is more stable and reliable during an operation, and the thermal actuator does not shake severely even if there is a fluid impact.

BRIEF DESCRIPTION OF THE DRAWINGS

FIG. 10a is a perspective view of a seat body of the end cover assembly in FIG. 9:

FIG. 10b is a sectional view of the seat body in FIG. 1.0a;

DETAILED DESCRIPTION OF EMBODIMENTS

Figure 1:
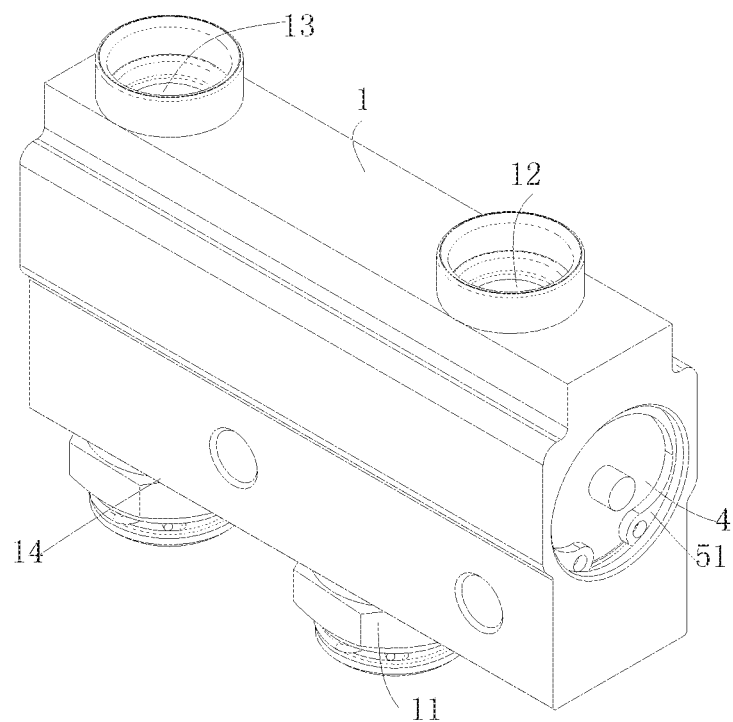
FIG. 1 is a perspective view of a thermostatic valve according to an embodiment of the present application.
Figure 2:
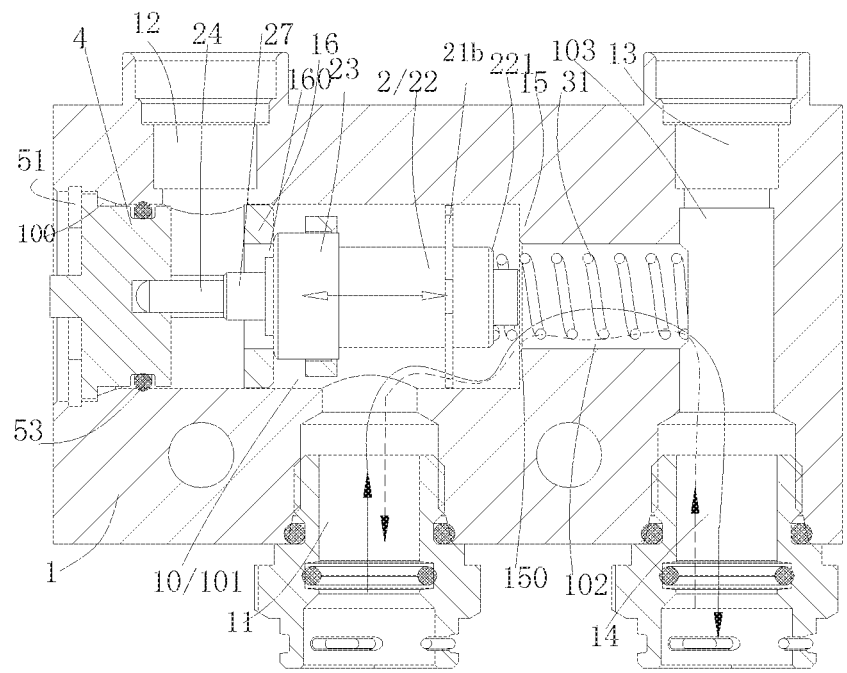
FIG. 2 is a sectional view of a thermostatic valve in a working state according to an embodiment of the present application.

The technical solutions of the present application are described below in detail with reference to drawings and embodiments. FIG. 1, FIG. 2. FIG. 4, FIG. 5a, FIG. 5b, and FIG. 6 are schematic views of one embodiment.

A thermostatic valve includes a valve body 1 in which a cavity 10 is provided, a first spring 31, an end cover assembly and a thermal actuator 2 which is mounted in the cavity 10. The valve body 1 is in communication with outside by at least three ports, including a first port 11, a second port 12 and a third port 13. One end of the cavity 10 is open, and this open end 100 is configured to mount an end cover assembly. There is no opening at an end of the valve body opposite to the end cover assembly in this technical solution, therefore the manufacturing procedures of the valve body are reduced. The first spring 31 is installed in the cavity 10 first and then the thermal actuator 2 is assembled into the cavity 10 through the open end 100 of the cavity 10, or the first spring 31 is sleeved on the thermal actuator 2 and then the thermal actuator 2 is assembled into the cavity 10. Then the end cover assembly is mounted on the open end 100 of the cavity 10, so that the end cover assembly is relatively fixed with the valve body. A position limitation in one direction, which means that the end cover assembly may not come out because of moving outward, is realized by fitting a retaining ring 51 into a recess of the open end 100, and the end cover assembly cannot move further into the cavity due to being position-limited by a step part of the open end, therefore the end cover assembly and the valve body are relatively fixed with each other. One end of the thermal actuator 2 is position-limited by the end cover assembly, and the other end of the thermal actuator 2 supported by the first spring 31 is arranged in the cavity 10. The cavity 10 includes a first cavity 101 and a second cavity 102, and a step part is formed between the first cavity 101 and the second cavity 102 because the second cavity 102 is smaller than the first cavity 101. The step part serves as a first valve seat 15 of the thermostatic valve, and forms a first valve port 150. The first cavity 101 is larger than the thermal actuator 2, which means each part of the first cavity fitting with the thermal actuator is larger than the corresponding part of the thermal actuator, instead of that all parts of the whole first cavity are larger than any part of the thermal actuator, therefore the thermal actuator can operate in a certain range in the cavity, that is, its motion stroke range. One end of the first spring 31 abuts against the bottom of the second cavity; the other end of the first spring 31 abuts against a main body 22 of the thermal actuator and is sleeved on a spring limiting part 26 of the thermal actuator close to the first valve port.

The first port 11 and the second port 12 are in communication with the first cavity 101, an axial position at the valve body of a communication part of the first port 11 with the first cavity 101 differs from that of the second port 12 with the first cavity 101. The valve body 1 is further provided with a third cavity 103 arranged in a direction different from the axial direction of the cavity 10, and the axial direction of the third cavity is substantially vertical to that of the cavity 10. The third port 13 is in communication with the second cavity 102 through the third cavity 103. The axial direction of the valve body in the specification refers to the axial direction of the cavity provided with the end cover assembly in the valve body, or refers to a direction which is the same as or is parallel to the axial direction of the thermal actuator. In addition, the valve body in this embodiment further includes a fourth port 14 in communication with the outside, the fourth port 13 is arranged opposite to the third port 14, and both the fourth port 13 and the third port 14 are in communication with the third cavity 103. The second cavity 102 and the third cavity 103 intersect with each other, forming a pair of shoulders 1021 for abutting against the spring. The second cavity 102 is substantially vertical to the third cavity 103 in this embodiment, and the bottom of the second cavity 102 extends at least partially into the third cavity 103. The first port 11 and the second port 12 may be arranged at opposite positions of the valve body and at different axial positions. Similarly, the fourth port 13 and the third port 14 can be arranged at opposite positions of the valve body, and the first port 11 and one of the fourth port 13 and the third port 14 are arranged at the same side, and the second port 12 and the other of the fourth port 13 and the third port 14 are arranged at the same side. It should be pointed out that the fourth port 14 may not be provided. The fourth port 14 is provided merely to facilitate the pipe installation and connection of the thermostatic valve.

The end cover assembly in this embodiment includes an end cover 4, which is provided with an accommodating cavity 401. The accommodating cavity 401 is configured to accommodate a part of a valve rod 24 of the thermal actuator, and a top end of the part of the valve rod 24 extending into the accommodating cavity 401 is arranged in the accommodating cavity 401. The end cover assembly in this embodiment further includes a main body 41, a valve seat part 44, a guiding part 46, a second connecting part 45 and a first connecting part 43. A groove 411 is provided at an outer side of the main body for arranging a sealing element, so that the main body of the end cover assembly is sealed with the open end 100 of the cavity 10. At least one groove 411 for receiving the sealing element is provided on the outer circumference side of the main body 41 of the end cover assembly, and an accommodating cavity 401 is provided inside the main body 41 of the end cover assembly, so that after the end cover assembly is fitted with the valve body, the sealing property between the end cover assembly and the valve body is improved by installing sealing elements 53 between the end cover assembly and the valve body. The main body 41, the valve seat part 44, the guiding part 46, the second connecting part 45, and the first connecting part 43 are all arranged in the end cover assembly 4, the second connecting part 45 and the first connecting part 43 are two cylindrical structures respectively. In addition, the number of the cylindrical structures may be three or more. The guiding part and the valve seat part have substantial annular structures, and an outer diameter of the valve seat part is larger than that of the guiding part. The main body 41 and the valve seat part 44 are connected by the first connecting part 43, and the guiding part 46 and the valve seat part 44 are connected by the second connection part 45. In the embodiment, the second valve seat 16 is located at the valve seat part 44, an inner diameter of the valve seat part 44 is smaller than that of the guiding part 46, and the inner diameter of the guiding part 46 is slightly larger than an outer diameter of a first outer wall part 23 of the thermal actuator 2. In the embodiment, the inner diameter of the guiding part 46 is larger than the outer diameter of the first outer wall part 23 of the thermal actuator 2 by 0.05 to 0.5 mm, thereby realizing guiding fit, that is, a sliding fit between the first outer wall part and the guiding part in the embodiment. The first outer wall part is larger than or equal to other parts of a main body of the thermal actuator. In addition, the position in sliding fit with the guiding part may also be provided on other outer wall part of the main body, such as a second outer wall part 27 slightly smaller than the first outer wall part between the first outer wall part and the valve rod. Besides, the inner diameter of the fitting part of the end cover assembly and an end of the valve rod of the thermal actuator, that is, the inner diameter of the accommodating cavity 401, is larger than the end of the valve rod of the thermal actuator by approximate 0.05 to 0.5 mm. The overall structure of the valve rod may be cylindrical, so the outer diameter of the valve rod is the outer diameter of the cylindrical structure. In this way, when the thermal actuator moves in a direction indicated by a dashed arrow in FIG. 2, on one hand, the thermal actuator achieves a preliminary positioning by an end of the valve rod and the cavity where the end is located; on the other hand, the thermal actuator achieves a better guiding and positioning by a sliding fit between the first outer wall part 23 serving as a guide fitting part and the guiding part 46 of the end cover assembly. In addition, a gap between the guiding part of the end cover assembly and the thermal actuator close to the guiding part, is set to be slightly smaller than a gap between the end cover assembly and the valve rod of the thermal actuator, so that the thermal actuator can be more stable during operation, and the thermal actuator is not prone to shake because of the pressure of an incoming fluid especially in a case that the first port serves as an inlet.

The thermal actuator 2 includes a main body 22, a valve rod 24, and a heat sensitive material filled in the thermal actuator. A volume of the heat sensitive material changes as a temperature changes, the volume change of the heat sensitive material pushes the valve rod 24 to move, so that the valve rod moves relative to the main body of the thermal actuator. The main body 22 further includes a first outer wall part 23, which serves as a second valve core in this embodiment. It should be noted here that, the first outer wall part 23 should not only include the side wall part of the main body 22, but also include a part of the outer wall relatively close to the valve rod. In addition, the side wall part of the main body 22 and the outer wall part relatively close to the valve rod may have an integrated structure or a separated structure. The first outer wall part 23 is relatively close to the valve rod 24. The end cover assembly is further provided with a second valve seat 16, and a through hole in the second valve seat 16 forms a second valve port 160. The first outer wall part 23, on the side relatively close to the valve rod, serves as a second valve core 231 which can be configured to block the second valve port 160. The second valve core 231 correspondingly matches with the second valve port and can be configured to block the second valve port 160 when the thermal actuator 2 moves toward the second valve port under certain conditions. The thermal actuator is further provided with a guide fitting part 21b at a position relatively close to the first valve port 150, and the guide fitting part 21b is fixedly arranged with the main body 22. The main body includes a fitting section 222 in sliding fit with the second cavity, the guide fitting part 21b is located at a position of the main body 22 which is relatively close to an end 221 of the fitting section, but still has a certain distance of s from the end 221 of the fitting section. The distance of s is greater than or equal to the maximum length of the end 221 of the fitting section of the main body 22 of the thermal actuator extending into the second cavity 102. In other words, the length of the fitting section fitting with the second cavity is s; even at the highest temperature, the end 221 of the fitting section of the main body 22 of the thermal actuator extends into the second cavity, but it can still be ensured that the guide fitting part 21b does not interfere with the first valve seat, that is, the fitting section does not completely enter the second cavity. The guide fitting part 21b has a substantially annular structure, and includes an annular part 210, multiple protrusions 211, and a recess 212. The guide fitting part 21b is fixed to the main body 22 by the annular part 210, or both the guide fitting part 21b and the main body 22 may be integrated. The protruding positions of the outer walls of the multiple protrusions 211 match with the inner wall of the first cavity to achieve a sliding fit between the guide fitting part and the first cavity. The outer diameter of the protrusions of the guide fitting part 21b is smaller than an inner diameter of a corresponding part of the first cavity by 0.05 to 0.5 mm, and the recess 212 between the protrusions matches with the valve body to form a flow-through part, so that the fluid can smoothly pass through, and is not greatly affected by the arrangement of the protrusions 211. It can be seen from the above that, the thermostatic valve has two guiding structures at upper and lower positions, so that the two ends of the thermal actuator achieve guidance during the operation. That is, one end close to the end cover assembly achieves guidance by the match between the first outer wall part 23 and the guiding part 46 of the end cover assembly, the guiding part 46 is an upper guiding part, and the first outer wall part 23 is an upper guide fitting part; the other end close to the first valve port achieves guidance by the match between the guide fitting part 21b and the first cavity, the inner wall part of the first cavity serves as a guiding part for matching with the guide fitting part 21b, and the guide fitting part 21b is a lower guide fitting part, so that the movement of the thermal actuator is more stable and reliable. In addition, in the case that the end close the first valve port is guided by the match between the guide fitting part 21b and the first cavity, the guiding structure on the side close to the end cover can be omitted, that is, no upper guiding structure is required, and basic requirements can also be met by an auxiliary guidance achieved by the match between the valve rod 24 of the thermal actuator and the cavity of the end cover.

One of the upper and lower guiding structures may be provided, or both of the upper and lower guiding structures may be provided. In the case that the upper guiding structure is provided, a part of the upper guide fitting part 23 can still match with the guiding part 46 when the second valve core 231 of the thermal actuator of the thermostatic valve abuts against the valve seat part 44 to block the second valve port 160, and when the end 221 of the fitting section of the thermal actuator of the thermostatic valve enters the second cavity to block the first valve port 150, a part of the upper guide fitting part 23 can also still match with the guiding part 46.

If the thermostatic valve has four ports, the first port 11 may be connected to an outlet for fluid, such as an oil circuit, of a gearbox, the second port 12 and the third port 13 may be separately connected to an inlet and an outlet of a heat exchanger for cooling the fluid of the gearbox, and the fourth port 14 may be connected to an inlet for fluid, of the gearbox. Connections may be realized by using pipes and/or connectors and so on, or direct connection is adopted. When the oil temperature in the gearbox is low, the heat-sensitive material in the thermal actuator contracts and the main body of the thermal actuator moves toward the second valve port 160 until the second valve core 231 abuts against the valve seat part 44 to block the second valve port 160, so that the fluid flows in a direction indicated by a solid arrow in FIG. 2. The fluid enters the thermostatic valve from the first port 11 to reach the first cavity, then passes through the first valve port 150, the second cavity 102 and the third cavity 103, and then flows back to the gearbox through the fourth port 14, without being cooled by the heat exchanger. When the fluid temperature in the gearbox is high, the heat-sensitive material in the thermal actuator 2 expands due to heat, and the main body 22 of the thermal actuator moves toward the first valve port 150, until the fitting section 222 of the main body 22 matches with the first valve port 150 to block the first valve port 150. The fluid enters the first cavity 101 of the thermostatic valve from the first port 11, then passes through the second valve port 160, passes through the second port 12, and then enters the heat exchanger of the system for cooling. The cooled fluid then passes through the outlet of the heat exchanger, the third port 13 and the third cavity 103, and then flows back to the gearbox through the fourth port 14. If the temperature further increases, the heat-sensitive material expands, the main body 22 further moves toward the first valve port, and the fitting section partially enters the second cavity, so that the opening of the second valve port increases, thereby controlling the oil temperature within an appropriate range.

In specific use, the thermostatic valve may be externally connected to the heat exchanger as the cooling device and an oil tank of the gearbox through pipes and/or connectors. For instance, the first port 11 is connected to the outlet of the oil circuit of the gearbox, the second port 12 and the third port 13 are separately connected to an inlet and an outlet of the heat exchanger cooling the fluid in the gearbox. If the thermostatic valve has only three ports and when the oil temperature in the gearbox decreases, the heat-sensitive material in the thermal actuator contracts or is in a relatively contracted state, the valve rod retracts toward the main body, the main body of the thermal actuator accordingly moves toward the second valve port 160 until the second valve core 231 abuts against the valve seat part 44 to block the second valve port 160, so that the oil can enter the thermostatic valve from the first port 11, then pass through the first valve port 150, and then flow back to the gearbox through the third port 13 or the fourth port, without being cooled by the heat exchanger. If the thermostatic valve has three ports, the oil flows out from the third port 13 and flows back to the gearbox. When the temperature of the fluid in the gearbox, such as the oil, increases, the heat-sensitive material in the thermal actuator 2 expands due to heat, and the main body 22 of the thermal actuator moves toward the first valve port 150 until the end 221 of the fitting section of the main body of the thermal actuator arrives at a certain position in the first valve port to block the first valve port 150. The fluid enters the thermostatic valve from the first port 11, then passes through the second valve port 160, passes through the second port 12, and enters the heat exchanger of the system for cooling, the cooled oil then flows back to the gearbox through the outlet of the heat exchanger. If the oil temperature further increases, the main body 22 moves toward the second cavity 102, the end 221 of the fitting section enters the second cavity, and the opening of the second valve port increases, so that the oil temperature is controlled within an appropriate range. If the thermostatic valve has four ports, the first port 11 is connected to the outlet for the fluid in the gearbox, such as the oil circuit, the second port 12 and the third port 13 are respectively connected to the inlet and the outlet of the heat exchanger for cooling the fluid in the gearbox, and the fourth port 14 is connected to an inlet of the fluid in the gearbox. Connections may be realized by using pipes and/or connectors and so on, or direct connecting may be adopted. Alternatively, the fourth port is connected to the fluid outlet of the gearbox, the first port is connected to the fluid inlet of the gearbox, and the third port and the second port are respectively to the fluid inlet and the fluid outlet of the heat exchanger.

Figure 3:
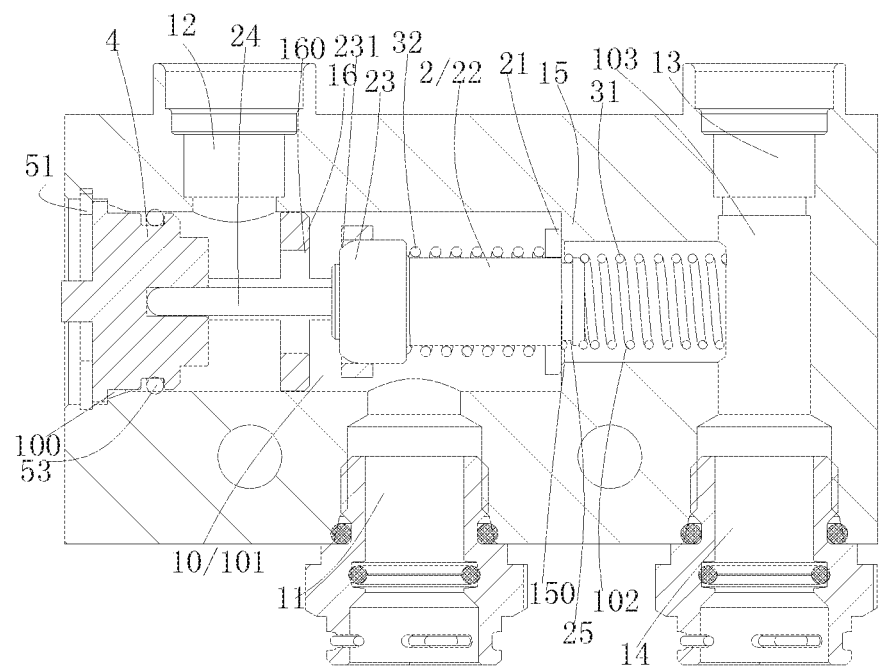
FIG. 3 is a sectional view of a thermostatic valve in a working state according to another embodiment of the present application.
Figure 4:
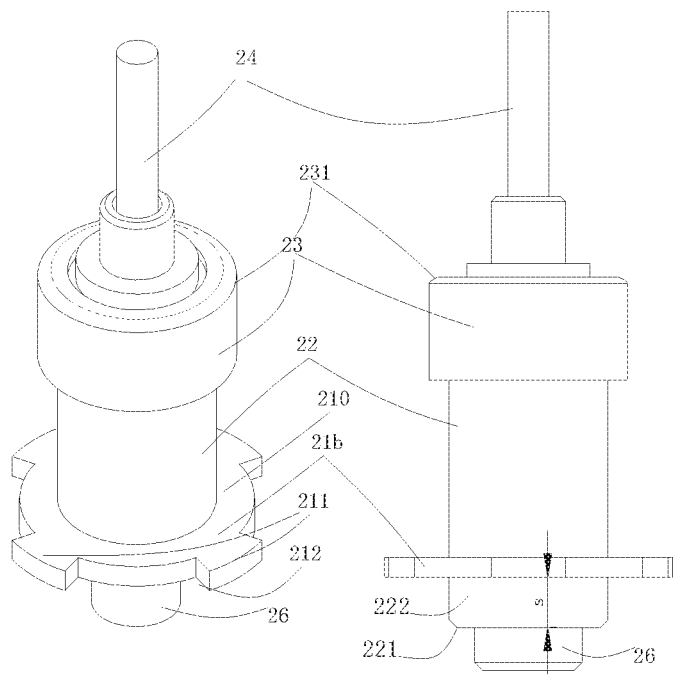
FIG. 4 is a schematic view of a thermal actuator of the thermostatic valve in FIG. 2.
Figures 5A, 5B:
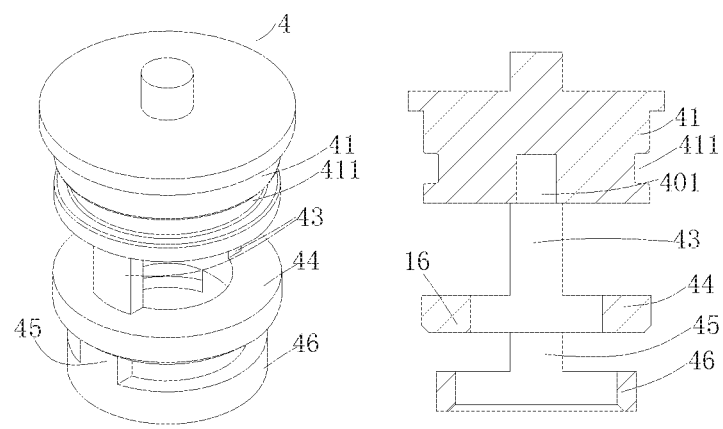
FIG. 5a is a schematic view of an end cover assembly of the thermostatic valve in FIG. 2.
FIG. 5b is a sectional view of an end cover assembly of the thermostatic valve in FIG. 2.

Another embodiment is provided below. As shown in FIG. 3, in this embodiment, the thermal actuator 2 includes a first valve core 21 which is slidable relative to a main body 22 of the thermal actuator. The first valve core 21 is arranged facing to a first valve port 150 or toward the first valve port 150. In a certain condition, the first valve core 21 moves toward the first valve port 150 of the thermal actuator 2 to block the first valve port 150. The main body 22 of the thermal actuator is smaller than the second cavity, while the first valve core is larger than the second cavity. One end of the first spring 31 abuts against the bottom of the second cavity, the other end of the first spring 31 is fixed in a recess 25 of the thermal actuator. The first valve core 21 is slidably sleeved on the main body 22 of the thermal actuator. The first valve core 21 is abutted by the first spring in the first spring direction and does not slip out. In a direction opposite to the first spring, the first valve core 21 is abutted by the second spring 32. In this way, the first valve core 21 can slide for a certain distance relative to the main body 22. A first outer wall part 23 is located on a side of the thermal actuator 2 opposite to the first valve core 21, and the first outer wall part 23 is relatively close to a valve rod 24.

In addition, the bottom of the second cavity 102 does not extend into the third cavity 103 too deep so as not to affect the fluid flow in the third cavity. The depth h of the second cavity 102 extending into the third cavity 103 is less than or equal to a quarter of the diameter d of the third cavity, that is, $h \leq \frac{1}{4}d$.

In specific use, the thermostatic valve may be externally connected to a heat exchanger which serve as cooling device and a gearbox oil tank, through pipes and/or connectors. For instance, the first port 11 is connected to the outlet of the gearbox oil circuit, and the second port 12 and the third port 13 are respectively connected to an inlet and an outlet of the heat exchanger cooling the gearbox fluid. When the temperature of the fluid in the gearbox, such as the oil, decreases, the heat-sensitive material in the thermal actuator contracts, the valve rod retracts toward the main body. Accordingly, the main body of the thermal actuator moves toward the second valve port 160 so that the first valve core 21 moves away from the first valve port, until the second valve core 231 abuts against the valve seat part 44 to block the second valve port 160, and thus the oil enters the thermostatic valve from the first port 11, then passes through the first valve port 150, the third port 13 and the fourth port and then flows back to the gearbox, without being cooled by the heat exchanger. When the temperature of the fluid in the gearbox, such as the oil, increases, the heat-sensitive material in the thermal actuator 2 expands due to heat, and the main body 22 of the thermal actuator moves toward the first valve port 150 until the first valve core abuts against the first valve seat to block the first valve port 150. In this case, the second valve core does not block the second valve port, the oil enters the thermostatic valve from the first port 11, then passes through the second valve port 160, and then enters the heat exchanger of the system via the second port 12 for cooling, the cooled oil then flows back to the gearbox through the outlet of the heat exchanger. If the oil temperature further increases, the main body further moves to the right side. In this case, an acting force applied by the first valve seat on the first valve core is greater than the spring force of the second spring, the front end of the main body further enters the second cavity, and due to the acting force of the first valve seat, the first valve core does not move anymore and compresses the second spring, so that the opening of the second valve port increases. If the thermostatic valve has three ports, the oil flows out from the third port 13 and flows back to the gearbox. In addition, if the oil temperature further increases, the main body 22 moves toward the second cavity 102, and the first valve core is abutted by a step part between the first cavity and the second cavity 10, i.e., the first valve seat 15, and thus may not extend into the second cavity, and the front end of the main body 22 may extend into the second cavity, thereby controlling the oil temperature within an appropriate range.

If the thermostatic valve has four ports, the first port 11 is connected to an outlet of the gearbox fluid, such as an oil circuit, the second port 12 and the third port 13 are respectively connected to an inlet and an outlet of the heat exchanger cooling the gearbox fluid, and the fourth port 14 is connected to an inlet of the gearbox fluid, and connections may be realized by using pipes and/or connectors and so on, or direct connecting is adopted. When the oil temperature in the gearbox decreases, the heat-sensitive material in the thermal actuator contracts and the main body of the thermal actuator moves toward the second valve port 160 until the second valve core 231 abuts against the valve seat part 44 to block the second valve port 160, so that the fluid flows in the direction indicated by a solid arrow in FIG. 2. The fluid enters the thermostatic valve from the first port 11 to reach the first cavity, then passes through the first valve port 150, the second cavity 102 and the third cavity 103, and then flows back to the gearbox through the fourth port 14, without being cooled by the heat exchanger. When the fluid temperature in the gearbox increases, the heat-sensitive material in the thermal actuator 2 expands due to heat, and the main body 22 of the thermal actuator moves toward the first valve port 150, until the first valve port 150 is blocked by the first valve core 21. The fluid enters the first cavity 101 of the thermostatic valve from the first port 11, then passes through the second valve port 160, and then enters the heat exchanger of the system through the second port 12 for cooling, the cooled fluid then passes through the outlet of the heat exchanger, the third port 13 and the third cavity 103, and then flows back to the gearbox through the fourth port 14, thereby controlling the oil temperature within an appropriate range.

Figure 6:
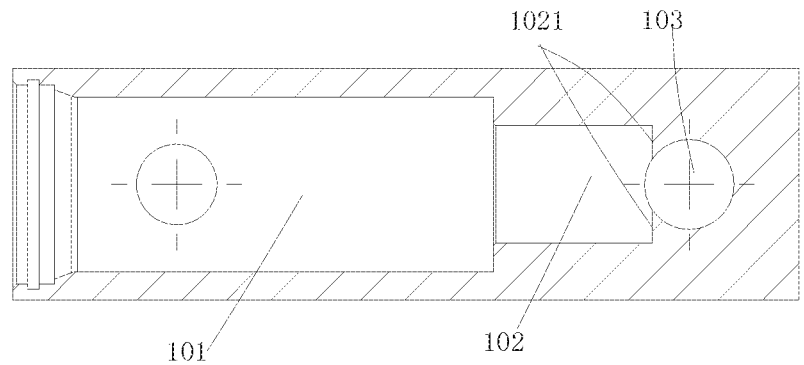
FIG. 6 is a sectional view of a valve body of the thermostatic valve in FIG. 2.
Figure 7:
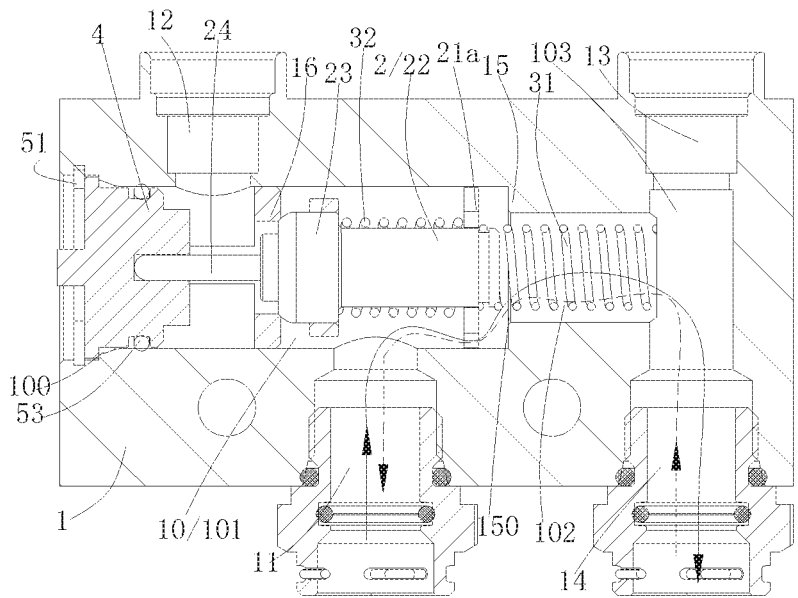
FIG. 7 is a sectional view of a thermostatic valve in a working state according to another embodiment of the present application.
Figure 8:
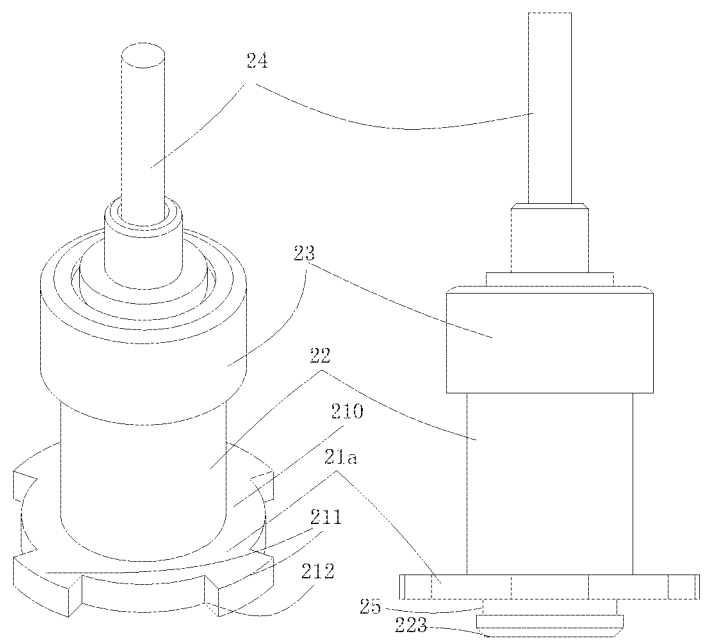
FIG. 8 is a schematic view of a thermal actuator of the thermostatic valve in FIG. 7.

Another embodiment is provided below. As shown in FIG. 7 and FIG. 8, FIG. 6 is a partial sectional view of the thermostatic valve, and FIG. 7 is a schematic structural view of a thermal actuator. In the figure, a first valve core 21a relatively close to a first valve port and a main body 22 are not fixedly arranged. In fact, the first valve core 21a may be disengaged from the main body before assembly, the first valve core and the main body are arranged to be slidable relative to each other, which is realized through position-limiting by position-limiting structure such as a first spring. The structure of the thermal actuator in this embodiment is different from that in the above embodiment, and the fit manner between the thermal actuator and the valve body at the first valve port is also different. The first valve core 21a of the thermal actuator in this embodiment also serves as a guide fitting part. The first valve core 21a is axially slidably arranged relative to the main body, one end of the first valve core 21a close to the first valve port is position-limited by a first spring, and the other end of the first valve core 21a abuts against one end of a second spring, that is, the other end of the first valve core 21a is position-limited by the second spring 32, and the other end of the second spring abuts against the main body of the thermal actuator and specifically abuts against a step part of the thermal actuator in this embodiment. The first valve core 21a as a guide fitting part fits with the first valve port, and is in a sliding fit with an inner wall part of a first cavity in this embodiment. In this embodiment, the first valve core 21a is position-limited by the first spring 31 in the direction of disengaging from the main body of the thermal actuator, or in the direction toward the first valve port, and one end of the first spring is fixed into a recess 25 of the thermal actuator. An inner hole of the first valve core 21a is smaller than the first spring 31, so the first valve core does not disengage from the main body, thereby realizing a position-limit in one direction. In the other direction toward a valve rod 24, the first valve core 21a abuts against one end of the second spring 32, so the first valve core 21a can move by a certain distance toward the valve rod in the case of a certain pressure. The other end of the second spring 32 abuts against a step part. The front end 223 of the main body 22 of the thermal actuator may extend into the second cavity 102, and when moving toward the second cavity to reach a certain position, the first valve core 21a may be abutted against by the first valve seat, thereby blocking the first valve port. Even at the highest temperature, the front end 223 of the main body 22 of the thermal actuator extends into the second cavity, but the first valve core 21a is limited due to abutting against the first valve seat. One end of the first spring 31 is sleeved on the main body and is retained in the recess 25 of the main body 22. The first valve core 21a or the main body 210 of the first valve core has a substantially annular structure. The first valve core 21a includes a main body 210, protrusions 211, and a recess 212 between adjacent protrusions 211. The outer walls of multiple protrusions match with the inner wall of the first cavity, so that the first valve core as a guide fitting part is in a sliding fit with the first cavity, and the recess 212 between the protrusions allows the fluid to pass smoothly without being severely influenced by the multiple protrusions 211. In this way, two ends of the thermal actuator respectively realize movement guiding, where one end close to the end cover is guided by the fitting between the first outer wall part 23 as a guide fitting part and the guiding part 46 of the end cover assembly, and the other end close to the first valve port is guided by the fitting between the multiple protrusions of the first valve core and the first cavity, so that the thermal actuator is more stable and reliable during the operation. The number of the protrusions is generally more than three, and the protrusions may be evenly distributed. In addition, in the case that the end close to the first valve port is guided by the fitting between the guide fitting part and the first cavity, the guiding structure close to the end cover can also be omitted, and instead, an auxiliary guidance can be achieved by the fitting between the valve rod 24 of the thermal actuator and the cavity of the end cover, thus basic requirements can also be met. In addition, preventing of the guide fitting part from disengaging out may not only be achieved by the springs, but also can be realized by arranging a retaining ring or a snap ring in the recess. Similarly, in this embodiment, one of the upper guiding part relatively close to the first valve port and the lower guiding part relatively close to the second valve port may be provided, or the both may be provided.

Figure 9:
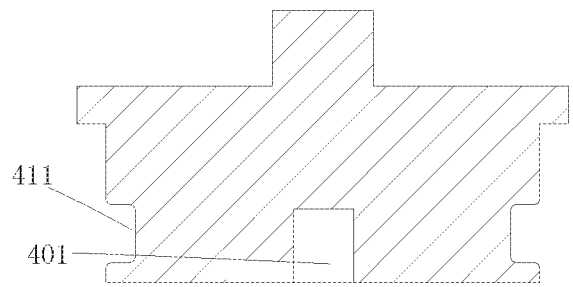
FIG. 9 is a sectional view of an end cover of an end cover assembly of a thermostatic valve according to the present application.
Figures 10A, 10B:
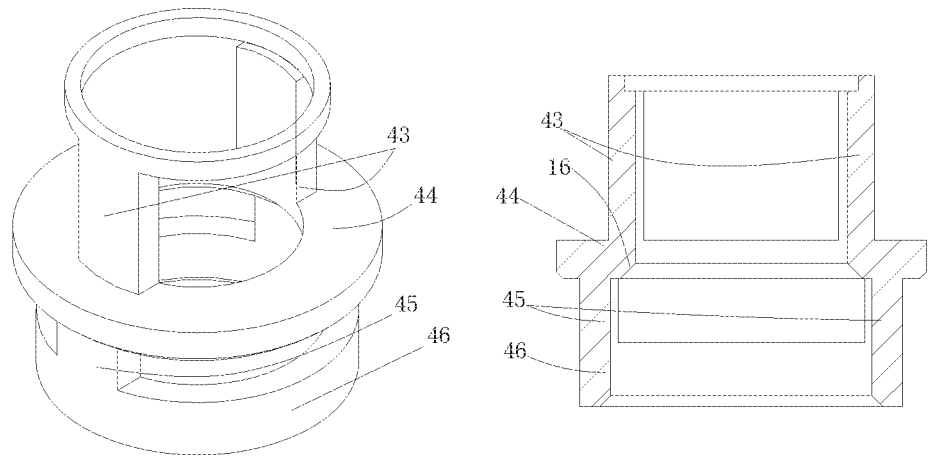

Another embodiment is provided below. As shown in FIG. 9, FIG. 10a and FIG. 10b, the end cover assembly includes an end cover and a seat body, and a guiding part and a first valve seat are arranged on the seat body. The seat body may be assembled together with the end cover, or the seat body and the end cover may be assembled separately and a relatively fixed or relatively position-limiting structure is formed after the seat body and the end cover are assembled into the cavity of the valve body. The end cover is provided with an accommodating cavity 401, and the end cover may be further provided with at least one groove 411 for accommodating sealing element on the outer circumference. The accommodating cavity is configured to accommodate a part of a valve rod of the thermal actuator and to limit the position of the valve rod. The seat body includes a first connecting part 43, a valve seat part 44, a second connecting part 45 and a guiding part 46, and the end cover is fixedly arranged with a valve body. Similarly, a second valve seat 16 is located at the valve seat part 44. The inner diameter of the valve seat part 44 is smaller than the inner diameter of the guiding part 46. The inner diameter of the guiding part 46 is slightly greater than an outer diameter of the first outer wall part 23 of the thermal actuator 2. Specifically, the inner diameter of the guiding part 46 is greater than the outer diameter of the first outer wall part 23 of the thermal actuator 2 by about 0.05 to 0.50 mm, so as to achieve a guide fitting between the guiding part 46 and the first outer wall part 23. Similarly, the inner diameter of a part of the end cover assembly fitting with an end of the valve rod of the thermal actuator, that is, the inner diameter of the accommodating cavity 401, is greater than one end of the valve rod of the thermal actuator by about 0.05-0.50 mm. If the accuracy permits, the inner diameter of the accommodating cavity 401 of the end cover assembly may be greater than one end of the valve rod of the thermal actuator by about 0.05 to 0.30 mm, so that the thermal actuator is more stable and reliable during the operation. On one hand, the thermal actuator achieves a preliminary positioning by locating one end of the valve rod in the accommodating cavity; on the other hand, the thermal actuator achieves a better guiding and positioning by a sliding fit between the first outer wall part 23 as a guide fitting part and the guiding part 46 of the end cover assembly. With this solution, the standardization of the end cover assembly can be achieved, that is, only different seat bodies need to be chosen for different types of thermostatic valve, and the seat body is relatively fixed in the cavity after being assembled. In this way, the end cover may be made of metal material, and the seat body may be made of plastic material, so the weight of the end cover assembly is relatively light, and the manufacture is convenient.

Figure 11:
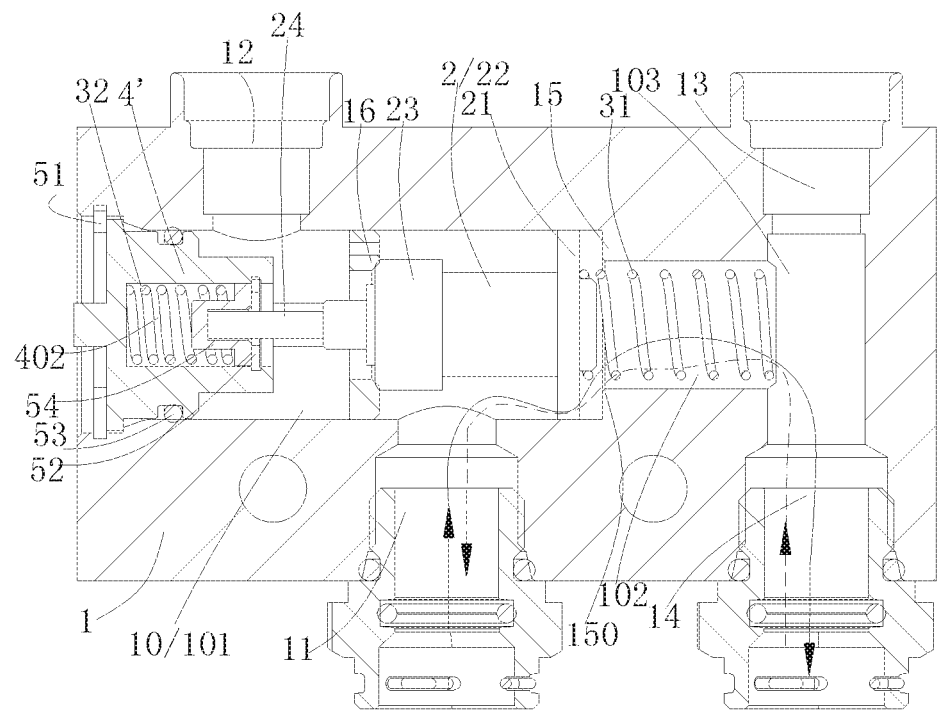
FIG. 11 is a sectional view of a thermostatic valve in a working state according to another embodiment of the present application.
Figure 12:
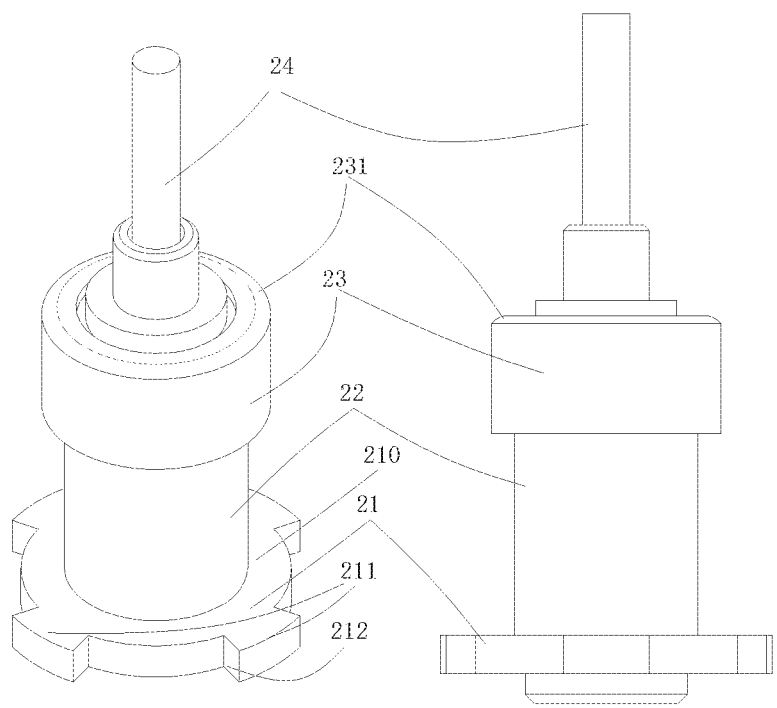
FIG. 12 is a schematic view of a thermal actuator of the thermostatic valve in FIG. 11.
Figure 13:
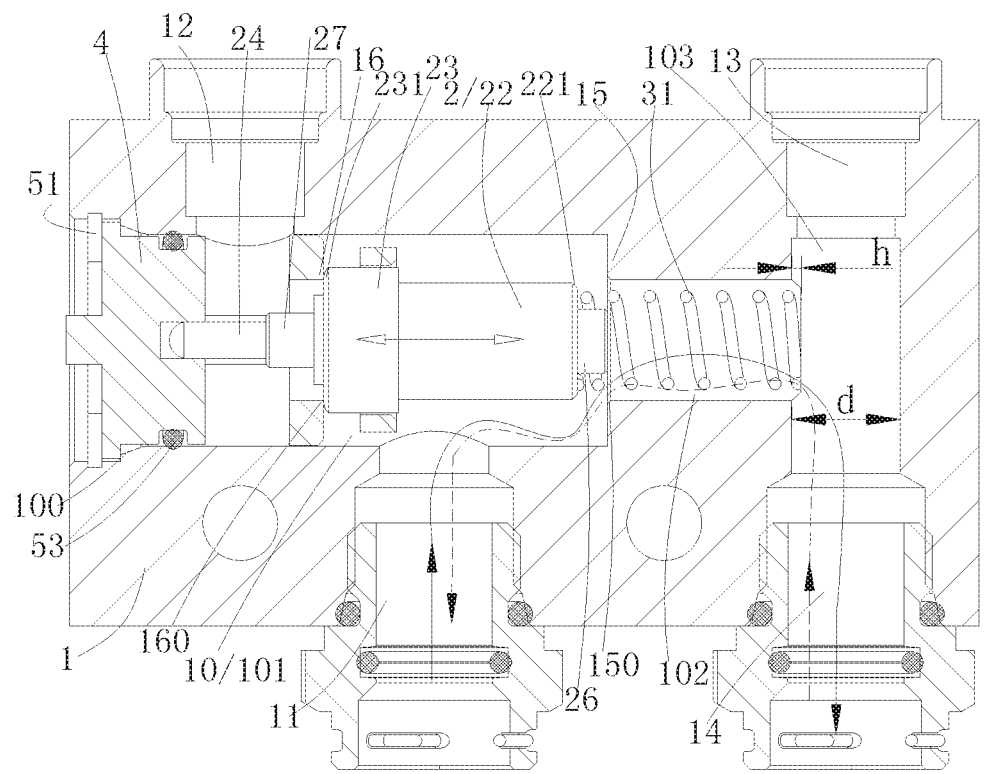
FIG. 13 is a sectional view of a thermostatic valve in a working state according to another embodiment of the present application.
Figure 14:
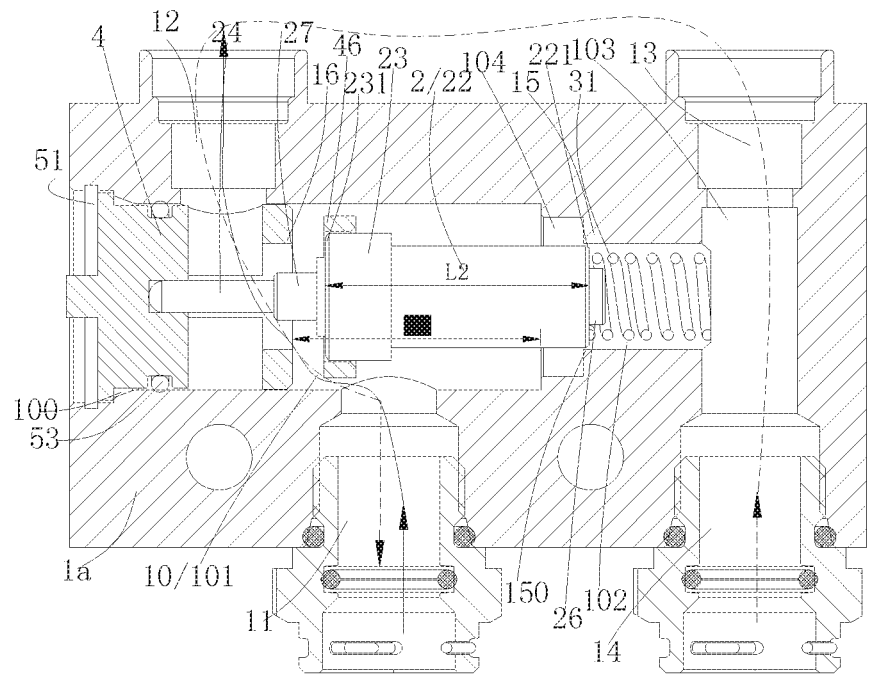
FIG. 14 is a sectional view of the thermostatic valve in FIG. 13 in another working state.

Another embodiment is provided below. As shown in FIG. 11 and FIG. 12, in this embodiment, no guiding structure is provided at a position relatively close to the second valve port, but a guiding structure is provided at a position relatively close to the first valve port. The structure of the end cover assembly and the structure of the thermal actuator in the embodiment are different from those in the above embodiments. In addition, compared with the embodiment in FIG. 6, the arrangement of the second spring is also different. The end cover assembly includes an end cover 4', a spring seat 54, a first retaining ring 52, and a second spring 32. The end cover 4' is provided with an accommodating cavity 402, the second spring 32 is located in the accommodating cavity 402, and the first retaining ring 52 is fixed in a groove of the accommodating cavity. The spring seat 54 is limited to the accommodating cavity 401 by the first retaining ring 52, one end of the second spring 32 abuts against the accommodating cavity 402, and the other end of the second spring 32 abuts against the spring seat 54. The spring seat has a cap-like structure. The spring seat is sleeved on a top end of the valve rod 24, and a part of the top end of the valve rod 24 extending into the spring seat is located in an inner cavity of the spring seat. One end of the second spring 32 abutting against the spring seat 54 abuts on an extension of the spring seat, the second spring 32 is in a compressed state, the initial deformation force of the second spring 32 is greater than the initial deformation force of the first spring 31, and the initial deformation force of the second spring 32 is greater than the elastic force generated by the deformation of the first spring 31 when the thermal actuator contacts with the first valve port to close the first valve port. The initial deformation force described in the specification refers to the pressure received by a spring which is in a compressed state and is to deform due to an external force, when the product is not in use. The end cover assembly in this embodiment is not provided with a guiding part that matches with the first outer wall part 23 of the thermal actuator, and therefore the end cover assembly is not provided with a second connecting part connecting the guiding part and the valve seat part.

The thermal actuator includes a main body 22, a valve rod 24 and a heat-sensitive material filled in the thermal actuator. In addition, the main body 22 of the thermal actuator includes a first valve core 21 arranged fixedly with or integrated with the main body, and the first valve core also serves as a guide fitting part that matches with the first cavity of the valve body. A volume of the heat-sensitive material changes as the temperature changes, and the volume change of the heat-sensitive material pushes the valve rod 24 to move, so that the valve rod is urged to move relative to the main body of the thermal actuator. The main body 22 further includes a first outer wall part 23, and the first outer wall part serves as a second valve core in this embodiment. The first outer wall part 23 is relatively close to the valve rod 24. The end cover assembly is further provided with a second valve seat 16. A through hole of the valve seat 16 forms a second valve port 160. On a side of the first outer wall part 23 relatively close to the valve rod is a second valve core 231 which can be configured to block the second valve port 160, and the second valve core 231 matches with the second valve port, and may be configured to block the second valve port 160 when the main body of the thermal actuator moves toward the second valve port under certain conditions. The first valve core 21 is arranged at a position of the thermal actuator relatively close to the first valve port 150. One end of the thermal actuator close to the first valve port abuts against the first spring, and the other end of the thermal actuator is position-limited to the cavity of the spring seat. When the temperature relatively increases, the valve rod of the thermal actuator moves outward relative to the main body, and the top end of the valve rod abuts against a bottom wall of the cavity of the spring seat. During specific operation, when the temperature of the fluid in the gearbox such as the oil decreases, the heat-sensitive material in the thermal actuator contracts and the valve rod retracts toward the main body. Under the elastic force of the first spring, the main body of the thermal actuator moves toward the second valve port 160 accordingly, so that the first valve core 21 of the main body 22 moves away from the first valve port or maintains a distance from the first valve port, until the second valve core 231 abuts against the valve seat part 44 to block the second valve port 160. In this way, the oil enters the thermostatic valve from the first port 11, then passes through the first valve port 150, and then flows back to the gearbox through the third port 13 or the fourth port, without being cooled by the heat exchanger. If the thermostatic valve has only three ports, the oil flows out from the third port 13 and flows back to the gearbox. When the temperature of the fluid in the gearbox, such as the oil, is high, the heat-sensitive material in the thermal actuator 2 expands due to heat, and the main body 22 of the thermal actuator moves toward the first valve port 150 until the first valve core 21 abuts against or blocks the first valve port, so that no fluid flows through the first valve port 150. In this case, the second valve core does not block the second valve port, the oil enters the thermostatic valve from the first port 11, passes through the second valve port 160, and enters the heat exchanger of the system through the second port 12 for cooling, the cooled oil then flows back to the gearbox through the outlet of the heat exchanger, or through the third port and the fourth port. If the oil temperature further increases, the main body 22 moves toward the second cavity 102, so that the opening of the second valve port increases, and the oil temperature is controlled within an appropriate range.

The orientation nouns, such as top, bottom, left and right, described in this specification are illustrated according to the corresponding orientation relationships defined in the drawings with the end cover assembly as the upper side and the central axis of the cavity of the thermostatic valve as the center, or defined according to the corresponding position relationship in the figures.

Another embodiment is provided below. As shown in FIG. 13 to FIG. 16, a thermal actuator 2 is arranged in a cavity 10 by being oppositely supported by an end cover assembly and a spring 31. One end of the spring 31 abuts against the bottom of the second cavity, and the other end of the spring 31 abuts against the thermal actuator and is sleeved on an end of a main body 22 of the thermal actuator.

A step part of the thermal actuator 2 close to one end of the spring 31 or a fitting section end 221 serves as a first valve core. The first valve core is arranged facing to the first valve port 150 or toward the first valve port 150. The main body of the thermal actuator 2 may move a certain distance in the direction indicated by a hollow arrow in the figure, and under certain conditions, the first valve port 150 may be blocked if the thermal actuator 2 moves toward the first valve port as illustrated by the figure. Specifically, the first valve core may extend into the first valve port, and a relative seal against fluid is achieved by a gap arranged between the two parts. The main body 22 of the thermal actuator may extend into the second cavity, and the part of the main body as the first valve core is the fitting section that fits with the second cavity, and the fitting section is smaller than the second cavity 102 by approximately 0.05 to 0.5 mm. In this embodiment, the second cavity is the matching cavity that matches with the fitting section.

In specific use, the thermostatic valve may be externally connected to a heat exchanger which serves as a cooling device and a gearbox oil tank through pipes and/or connectors. For instance, the first port 11 is connected to an outlet of a gearbox oil circuit, and the second port 12 and the third port 13 are separately connected to an inlet and an outlet of the heat exchanger cooling the gearbox fluid. When the oil temperature in the gearbox decreases, the heat-sensitive material in the thermal actuator contracts or is in a relatively contracted state, the valve rod retracts toward the main body. Accordingly, the main body of the thermal actuator moves toward the second valve port 160, until the second valve core 231 abuts against the valve seat part 44 to block the second valve port 160. In this case, the fitting section is located outside the second cavity, that is, the first valve port is open, so that the oil flows in the direction indicated by a solid arrow shown in FIG. 2. The oil enters the thermostatic valve from the first port 11, then passes through the first valve port 150 and the third port 13 or the fourth port, and then flows back to the gearbox without being cooled by the heat exchanger. If the thermostatic valve has three ports, the oil flows out through the third port 13 and flows back to the gearbox. When the temperature of the fluid in the gearbox, such as the oil, increases, the heat-sensitive material in the thermal actuator 2 expands due to heat, and the main body 22 of the thermal actuator moves toward the first valve port 150 until an end 221 of the fitting section of the main body extends into the second cavity to block the first valve port 150, and the fitting section of the main body herein serves as the first valve core matching with the first valve port. The oil enters the thermostatic valve from the first port 11, passes through the second valve port 160 and the second port 12, and then enters the heat exchanger of the system for cooling. The cooled oil then flows back to the gearbox through the outlet of the heat exchanger. If the oil temperature further increases, the main body 22 further moves toward the second cavity 102, and the end 221 of the fitting section extends into the second cavity, and the opening of the second valve port increases, so that the oil temperature is controlled within an appropriate range.

If the thermostatic valve has four ports, the first port 11 may be connected to an outlet of the gearbox fluid, such as an oil circuit, the second port 12 and the third port 13 are separately connected to an inlet and an outlet of the heat exchanger cooling the gearbox fluid, and the fourth port 14 is connected to an inlet of the gearbox fluid, and connections may be realized by using pipes and/or connectors and so on, or direct connecting is adopted. When the oil temperature in the gearbox decreases, the heat-sensitive material in the thermal actuator contracts and the main body of the thermal actuator moves toward the second valve port 160 until the second valve core 231 abuts against the valve seat part 44 to block the second valve port 160. In this way, the fluid flows in the direction indicated by a solid arrow in FIG. 2. The fluid enters the thermostatic valve from the first port 11 to reach the first cavity, then passes through the first valve port 150, the second cavity 102 and the third cavity 103, and then flows back to the gearbox through the fourth port 14, without being cooled by the heat exchanger. When the fluid temperature in the gearbox increases, the heat-sensitive material in the thermal actuator 2 expands due to heat, and the main body 22 of the thermal actuator moves toward the first valve port 150, until the end of the fitting section, serving as the first valve core, of the main body extends into the second cavity to block the first valve port 150. The fluid enters the first cavity 101 of the thermostatic valve from the first port 11, then passes through the second valve port 160, passes through the second port 12, then enters the heat exchanger of the system for cooling. The cooled fluid then passes through the outlet of the heat exchanger, the third port 13 and the third cavity 103, and then flows back to the gearbox through the fourth port 14, thereby controlling the oil temperature within an appropriate range. In addition, the fourth port may also be connected to the outlet of the gearbox fluid, such as an oil circuit, and the first port is connected to the inlet of the gearbox fluid, such as an oil circuit.

Figure 15:
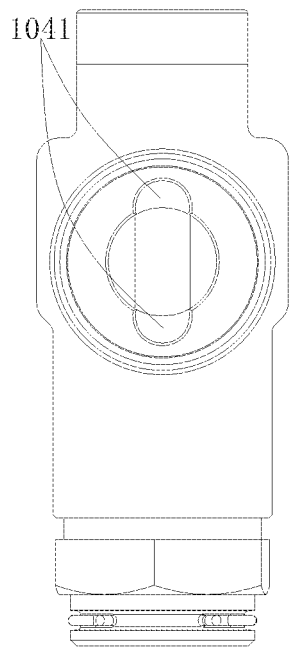
FIG. 15 is a top view of a valve body of the thermostatic valve in FIG. 13.
Figure 16:
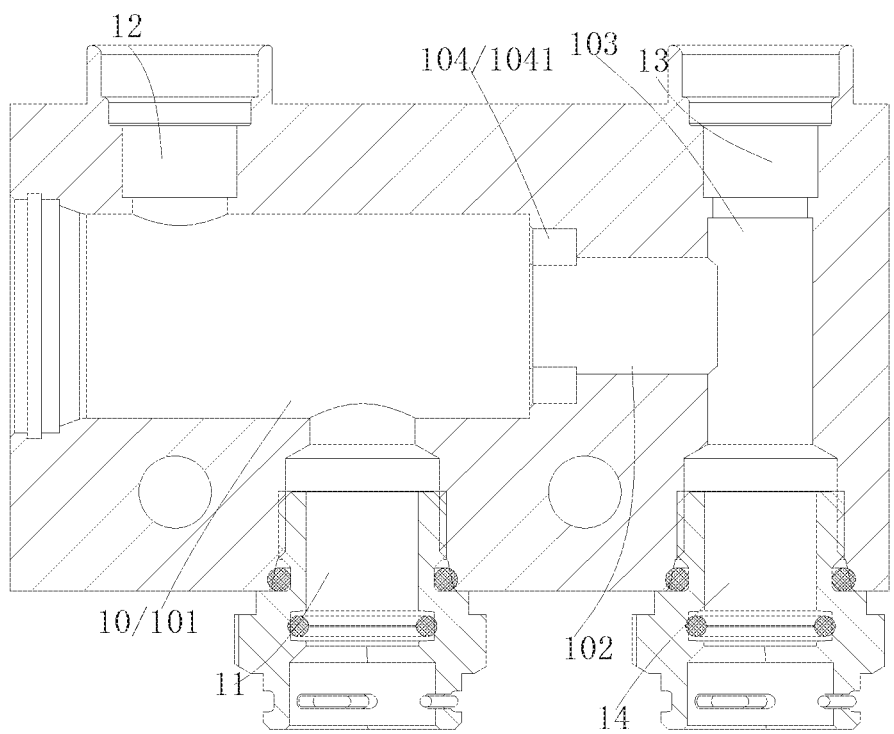
FIG. 16 is a sectional view of a valve body of the thermostatic valve in FIG. 13.

As shown in FIG. 15 and FIG. 16, a valve body 1*a* includes a first cavity 101 and a second cavity 102. Most of the first cavity is larger than the second cavity. The first cavity 101 further includes a guiding cavity 104, and the guiding cavity 104 is arranged close to the second cavity 102. Most of an inner wall part of the guiding cavity 104 has the same size as the second cavity 102, or is an extension of the second cavity toward the first cavity, or most of the inner wall part of the guiding cavity is smoothly transited to an inner wall part of the second cavity. The guiding cavity 104 further includes two flow-through parts 1041. Parts of the guiding cavity 104 expect the flow-through parts are in sliding fit with the main body 22 of the thermal actuator, and the flow-through parts may allow the fluid to flow through when an end of a fitting section of the main body of the thermal actuator is located at the guiding cavity 104. The guiding cavity 104 and the thermal actuator are still in sliding fit, so the position of the thermal actuator in the guiding cavity is limited, and guidance during movement is better and motions are more stable and reliable. Alternatively, the number of the flow-through parts may be three or more. The second cavity 102 is larger than the main body 22 of the thermal actuator by approximately 0.05 to 0.5 mm, accordingly, parts of the guiding cavity 104 except the flow-through parts are larger than the main body 22 of the thermal actuator by approximately 0.05 to 0.5 mm. That is, the thermal actuator is in sliding and clearance fit with the guiding cavity 104 and the second cavity. When the oil temperature in the gearbox decreases, the heat-sensitive material in the thermal actuator contracts, and the main body 22 of the thermal actuator moves toward the second valve port 160 under the elastic force of the spring 31, until the second valve core 231 abuts against the valve seat part 44 to block the second valve port 160. In this case, the fitting section is located outside the second cavity, and an end close to the first valve port, of the fitting section of the main body of the thermal actuator, is located in the guiding cavity 104, or in other words, a length L2 of the thermal actuator from the end of the second valve core to the end of the fitting section is larger than the length L1 between the second valve seat and the guiding cavity, so as to meet the requirement of good guidance. In this way, the fluid enters the thermostatic valve from the first port 11 to reach the first cavity 101, then passes through the flow-through part 1041 of the guiding cavity 104, the first valve port 150, the second cavity 102, the third cavity 103 and passes through the fourth port 14, then flows back to the gearbox without being cooled by the heat exchanger. When the fluid temperature in the gearbox increases, the heat-sensitive material in the thermal actuator 2 expands due to heat, and the main body 22 of the thermal actuator moves toward the first valve port 150, until the end of the fitting section of the main body 22 extends into the second cavity 102 to block the first valve port 150. The fluid enters the first cavity 101 of the thermostatic valve from the first port 11, then passes through the second valve port 160, passes through the second port 12, and then enters the heat exchanger of the system for cooling. The cooled fluid then passes through the outlet of the heat exchanger, the third port 13 and the third cavity 103, and then flows back to the gearbox through the fourth port 14, thereby controlling the oil temperature within an appropriate range. In this way, during operation of the thermal actuator, not only a guiding structure close to the end cover fits with the end cover assembly, but also a guiding structure close to the second cavity fits with the valve body, so the thermal actuator is more stable and does not deviate during the operation, and also it is not necessary to provide a spring for buffering, and a sealed working stroke of the thermal actuator can be relatively large. In addition, if the thermal actuator is provided with a guiding structure close to the first valve port, the guiding structure between the end cover assembly and the thermal actuator can be omitted. The valve rod of the thermal actuator and a cavity of the end cover fit with each other at a part close to the end cove assembly, thus basic requirements can also be met, that is, the guiding part of the end cover assembly can be omitted.

Figure 17:
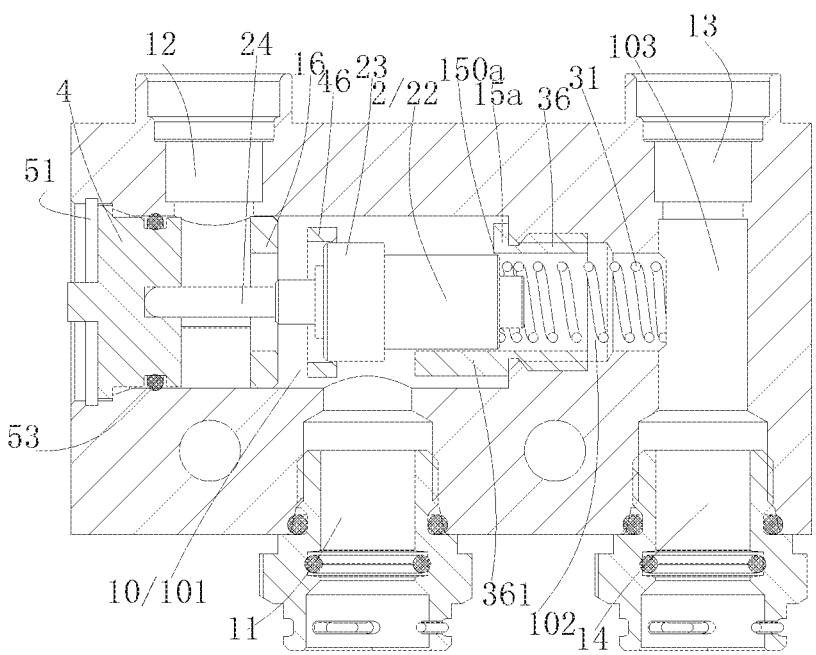
FIG. 17 is a partially sectional view of a thermostatic valve according to another embodiment of the present application.
Figures 18A, 18B:
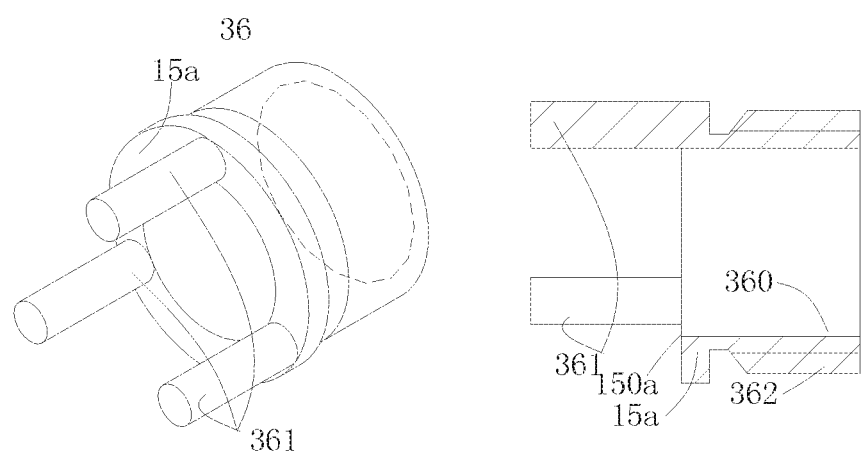
FIG. 18a is a perspective view of a guiding element of the thermostatic valve in FIG. 17.
FIG. 18b is a sectional view of a guiding element of the thermostatic valve in FIG. 17.

Another embodiment is provided below, as shown in FIG. 17. FIG. 18*a* and FIG. 18*b*. In the figures, the thermostatic valve further includes a guiding element 36, the second cavity is further provided with a thread part, and the guiding element 36 and the valve body are relatively fixed by thread fit. The guiding element 36 includes an external thread part 362, an inner cavity 360, a first valve seat 15*a*, and guide posts 361. In this embodiment, the inner cavity of the guiding element serves as a fitting cavity that fits with a fitting section of the thermal actuator, and the fitting section of the main body 22 of the thermal actuator is in a sliding fit with the inner cavity 360 of the guiding element 36, and one end of the fitting section of the main body 22 is slidable in a space limited by the guide posts 361 of the guiding element 36, thus the guide posts are combined to form a guiding part. In addition, the guide posts may have other shapes, such as a partial annular structure. The end of the fitting section of the main body 22 of the thermal actuator is limited by three guide posts and thus may not slip out or deviate, so that the thermal actuator is more reliable and stable during the operation. Different from the above embodiments, in this embodiment, the first valve seat and the first valve port are arranged on the guiding element rather than the valve body.

In the several embodiments provided above, the guiding part of the thermostatic valve fitting with the end cover assembly has an annular structure, and may also be a combination of several cylindrical structures and with the combination structure, the thermal actuator does not disengage from the guiding part. The guiding part may be similar to a combination of two or more arc-shaped columns, and the arc-shaped columns may be parts of the same annular structure. The interior of the guiding part may have an arc-shaped structure that matches with the structure of the thermal actuator, so the guiding requirement of the thermal actuator can also be realized. A length of fitting between the guiding part of the end cover assembly and the guide fitting part of the thermal actuator is greater than the moving stroke of the thermal actuator in the cavity. If the length of fitting is greater than the stroke by more than 1 mm, the thermal actuator always matches with the guiding part during moving in the cavity.

The inlet of the thermostatic valve in the embodiments described above may be the first port, and the inlet for fluid flowing in the thermostatic valve may also be the third port 13 or the fourth port 14. If there are four ports, the fluid may flow from one of the third port and the fourth port, thus the object of controlling by the thermostatic valve can also realized. One of the third port and the fourth port is in communication with the outlet of the gearbox fluid, and the other of the third port and the fourth port is in communication with the inlet of the heat exchanger fluid; and the second port is in communication with the outlet of the heat exchanger fluid, and the first port is in communication with the inlet of the gearbox fluid. In this way, if the pressure in the temperature control system is abnormal, the temperature control system can have the function of abnormal pressure relief. For example, when the pipeline from the inlet of the heat exchanger fluid to the outlet of the heat exchanger fluid is blocked or the circulation is not smooth, due to the increase of the flow resistance, the fluid may not circulate normally. Therefore, the pressure of the fluid from the gearbox outlet may increase because of abnormal circulation, that is, the pressure in the space where the second cavity and the third cavity of the thermostatic valve are located may increase. Due to poor fluid circulation or blockage and the fact that the first valve port is closed, the pressure in the first cavity is much lower since the first cavity is in communication with the inlet of the gearbox. In this case, there is a certain pressure difference between two sides of the first valve port, that is, the second cavity and the first cavity. In a case that the pressure difference reaches a certain level, for instance, the force generated by the pressure difference is greater than the difference between the current deformation force of the second spring and the deformation force of the first spring when the first valve port is closed, or in a case that the force generated by the pressure difference can overcome the difference between the current deformation force of the second spring and the current deformation force of the first spring, the thermal actuator of the thermostatic valve moves toward the second valve port under the resultant force. That is, safe pressure relief is achieved, thereby avoiding the failure of the system, that is, the temperature control system can perform pressure relief under pressure abnormal conditions. Therefore, it is not necessary to separately provide a pressure relief device to perform pressure relief, and the thermostatic valve has a relatively simple structure.

Therefore, it can be seen from the above-described embodiments that, a corresponding guide fitting part is provided between the relatively fixed part of the thermostatic valve and the part of the thermal actuator that needs to move, so that the thermal actuator can be more stable and reliable during operation. In addition, in the above embodiments, the guiding structure relatively close to the first valve port allows the guide fitting part to move along with the thermal actuator, that is, the guide fitting part is fixed relative to the main body or is relatively slidable within a certain range. An annular structure similar to the above first valve core may also be provided in the first cavity, and is fixed with the inner wall part of the first cavity by such as a tight fit, and the main body of the thermal actuator is sleeved on the annular structure, thereby forming a corresponding guiding structure. Alternatively, the guide fitting part may be fixedly fitted with the first cavity, the protrusions of the guide fitting part are fixedly arranged with the inner wall part of the first cavity, and the inner wall part of the guide fitting part is in sliding fit with the thermal actuator, so that the thermal actuator can also be stable and reliable during the operation.

The above-described embodiments are merely specific embodiments of the present application, and are not intended to limit the present application in any form. Although the present application has been disclosed by the above preferred embodiments, the preferred embodiments should not be construed as limiting the scope of the disclosure. Those skilled in the art, can make many possible changes and modifications to the technical solutions of the present application or change the embodiments into equivalent embodiments with equivalent changes using the above-disclosed technical contents, without departing from the scope of the technical solution of the present application. Therefore, any content that does not depart from the technical solutions of the present application, and any simple modification, equivalent change, and modification made to the above embodiments according to the technical essence of the present application all fall within the protection scope of the technical solution of the present application.

The invention claimed is:
1. A thermostatic valve, comprising:
a valve body in which a cavity is provided;
an end cover assembly; and
a thermal actuator and at least one spring mounted in the cavity;
wherein
the valve body is provided with at least three ports comprising a first port, a second port and a third port;
the thermal actuator comprises a valve rod and a main body, the spring comprises a first spring, the cavity comprises a first cavity and a second cavity, and the second cavity is away from the end cover assembly relative to the first cavity;
the first port is in communication with the first cavity, and the third port is in communication with the second cavity;
the first spring is partially or completely located in the second cavity;
the thermal actuator is partially or completely located in the first cavity, and the first cavity is larger than the thermal actuator;
one end of the thermal actuator directly or indirectly abuts against or is supported on one end of the first spring close to the thermal actuator, and the other end of the thermal actuator is position-limited by the end cover assembly; wherein
the end cover assembly comprises a main body part, a valve seat part, an upper guiding part, a first connection part and a second connection part;
the second connection part connects the valve seat part with the upper guiding part, the valve seat part is connected to the main body part through the first connection part; and
the thermal actuator comprises an upper guide fitting part fitting with the upper guiding part, and an inner diameter of the upper guiding part is greater than an outer diameter of the upper guide fitting part of the thermal actuator;
the thermostatic valve further comprises a guide fitting part, wherein the guide fitting part comprises at least two protrusions, a recess located between adjacent protrusions, and an annular part of a substantially annular structure, the guide fitting part is in a sliding fit with at least one of an inner wall part of the first cavity, and the thermal actuator; and
in an axial direction of the thermal actuator, the guide fitting part is located between an intersection of the first port and the first cavity and an intersection of the second cavity and the first cavity.
2. The thermostatic valve according to claim 1, comprising a first valve seat and a second valve seat which are fixedly arranged, wherein:
the first valve seat is provided with a first valve port, and the second valve seat is provided with a second valve port;

the first valve seat is located at a position in the second cavity relatively close to the first cavity or at a position in the first cavity relatively close to the second cavity; and in the axial direction of the thermal actuator, the first valve seat is located between the first port and the third port of the valve body, and the second valve seat is located between the first port and the second port of the valve body.

3. The thermostatic valve according to claim 2, wherein the guide fitting part is in sliding fit with an inner wall part of the first cavity, and the guide fitting part is fixedly arranged or integrated with the thermal actuator;

the main body of the thermal actuator comprises a fitting section in sliding fit with the second cavity, and the fitting section is smaller than the second cavity; and outer walls of the protrusions fit with the inner wall of the first cavity to form a sliding fit structure, and the fitting section of the main body is in sliding fit with the first valve port, and in the axial direction of the thermal actuator, the guide fitting part is located between the fitting section and the first port.

4. The thermostatic valve according to claim 2, wherein the guide fitting part is in sliding fit with the inner wall part of the first cavity, the guide fitting part is fixedly arranged or integrated with the thermal actuator, and the guide fitting part further serves as a first valve core that fits with the first valve port;

the first valve core is configured to block the first valve port, an outer diameter of the annular part of the guide fitting part is greater than or equal to an inner diameter of the second cavity;

the thermostatic valve further comprises a second spring, and the first spring and the second spring are respectively located at two opposite sides of the thermal actuator;

the end cover assembly comprises the second spring, the valve rod of the thermal actuator is directly or indirectly abutted by the second spring when the valve rod moves toward the end cover, and one end of the first spring directly or indirectly abuts against the main body; and the outer walls of the protrusions fit with the inner wall of the first cavity to form a sliding fit structure.

5. The thermostatic valve according to claim 2, wherein the guide fitting part is in sliding fit with the inner wall part of the first cavity, and the guide fitting part is in sliding fit with the thermal actuator;

the thermostatic valve further comprises a second spring, the first spring and the second spring are respectively located at two sides of the guide fitting part, and the guide fitting part further serves as a first valve core that fits with the first valve port; and the guide fitting part fits with the first valve port and blocks the first valve port when the guide fitting part moves to a step part between the first cavity and the second cavity, and an outer diameter of the annular part of the guide fitting part is larger than or equal to an inner diameter of the second cavity.

6. The thermostatic valve according to claim 2, wherein the second valve seat is located in the valve seat part; and the inner diameter of the upper guiding part is greater than the outer diameter of the upper guide fitting part of the thermal actuator by 0.05 mm to 0.5 mm.

7. The thermostatic valve according to claim 6, wherein each of the upper guiding part and the valve seat part has a substantially annular structure;

an inner hole of the valve seat part is smaller than an inner hole of the upper guiding part, and an outer diameter of the valve seat part is greater than the outer diameter of the upper guiding part;

the upper guiding part is closer to the first valve port than the valve seat part; and the main body part of the thermal actuator comprises an outer wall part, the outer wall part serves as the upper guide fitting part, the inner diameter of the upper guiding part is greater than an outer diameter of the outer wall part of the thermal actuator, and the outer wall part is in a sliding fit with the upper guiding part.

8. A thermostatic valve, comprising:

a valve body with a cavity;

an end cover assembly; and a thermal actuator, a first spring and a second spring installed in the cavity;

wherein the valve body is provided with at least three ports, the three ports comprise a first port, a second port and a third port;

the thermal actuator comprises a valve rod and a main body; wherein the thermostatic valve comprises a first valve port and a second valve port;

the thermostatic valve operates in at least two operation states: in a first state, the second valve port is open and the first port is in communication with the second port through the second valve port; and in a second state, the first valve port is open and the third port is in communication with the first port through the first valve port;

the thermal actuator comprises a first valve core and a second valve core;

the main body is away from the end cover assembly relative to the valve rod, and the first valve core is away from the end cover assembly relative to the second valve core;

the first valve core matches with the first valve port, and the second valve core matches with the second valve port;

the second valve core is fixedly arranged on the main body or is a part of the main body, the first valve core is arranged in sliding fit with the main body;

the first spring and the second spring are respectively located on two sides of the first valve core, the first spring is located on one side of the first valve core that is relatively away from the end cover assembly, the second spring is located on one side of the first valve core that is relatively close to the end cover assembly, one end of the second spring directly or indirectly abuts against the first valve core and the other end of the second spring directly or indirectly abuts against the main body of the thermal actuator; and the thermostatic valve comprises a guiding part fixedly arranged with respect to the thermostatic valve, and the thermal actuator comprises a guide fitting part fitting with the guiding part.

9. The thermostatic valve according to claim 8, wherein the main body of the thermal actuator comprises a fitting section, the thermostatic valve further comprises a matching cavity; in a case that the fitting section is partially located in the matching cavity, the fitting section and the matching cavity are in sliding fit, and the fitting section is relatively away from the end cover assembly, and the fitting section is smaller than the matching cavity.

10. A thermostatic valve, comprising:
a valve body with a cavity;
an end cover assembly;
a thermal actuator installed in the cavity;
a spring;
a fixedly arranged guiding part; and
a matching cavity, wherein
the valve body is provided with at least three ports, the three ports comprise a first port, a second port and a third port;
the thermal actuator comprises a valve rod and a main body, the cavity comprises a first cavity and a second cavity, and the second cavity is away from the end cover assembly relative to the first cavity;
the first port is in communication with the first cavity, and the third port is in communication with the second cavity; the spring is partially or completely located in the second cavity; and the thermal actuator is at least partially located in the first cavity, and the first cavity is larger than the thermal actuator;
one end of the thermal actuator directly or indirectly abuts against or is supported on one end of the spring close to the thermal actuator, and the other end of the thermal actuator is position-limited to the end cover assembly;
the thermal actuator comprises a guide fitting part that is in sliding fit with the guiding part; and
the main body of the thermal actuator comprises a fitting section, in a case that the fitting section is partially located in the matching cavity, the fitting section and the matching cavity are in sliding fit, and the fitting section is relatively away from the end cover assembly, and the fitting section is smaller than the matching cavity.

11. The thermostatic valve according to claim 10, wherein the first cavity comprises a guiding cavity, the guiding cavity is arranged close to the second cavity, and at least a part of an inner wall part of the guiding cavity has a same size as the second cavity or at least a part of the inner wall of the guiding cavity is in smooth transition with an inner wall of the second cavity; and
the guiding cavity comprises at least one flow-through part, there is a space between the main body of the thermal actuator and the flow-through part through which fluid flows, and the main body of the thermal actuator and a part of the guiding cavity except the flow-through part are in a sliding fit.

12. The thermostatic valve according to claim 11, wherein the thermostatic valve further comprises a first valve seat and a second valve seat, the first valve seat is provided with a first valve port, and the second valve seat is provided with a second valve port; the thermal actuator further comprises a first valve core and a second valve core; and the guiding cavity is located between the first port and the second cavity; in a case that a length of the main body of the thermal actuator, between an end where the second valve core matches with the second valve port and an end of the fitting section matching with the first valve port, is greater than a length between the second valve seat and the guiding cavity, or in a case that the second valve core abuts against the second valve seat to block the second valve port, the end of the fitting section of the main body of the thermal actuator close to the first valve port is located in the guiding cavity.

13. The thermostatic valve according to claim 10, further comprising: a first valve port, a second valve port and a guiding element, wherein
the guiding element comprises a first valve seat and at least two guide posts, each of the guide posts is at least partially located in the first cavity and a length of the guide post is greater than a motion stroke of the thermal actuator;
the guiding element is fixedly arranged relative to the valve body, the guiding element is at least partially located in the second cavity, the guiding element comprises the matching cavity and the first valve port, and the spring is partially or completely located in the matching cavity of the guiding element;
the guiding element comprises a guiding part that is fixedly arranged, and the fitting section of the thermal actuator is in a sliding fit with the matching cavity of the guiding element; and
the fitting section is smaller than the matching cavity of the guiding element, and the guiding part limits the position of the fitting section in a radial direction.

* * * * *